March 3, 1931.  R. B. ELSWORTH  1,794,597
RAILWAY TRAFFIC CONTROLLING SYSTEM
Filed Feb. 27, 1929
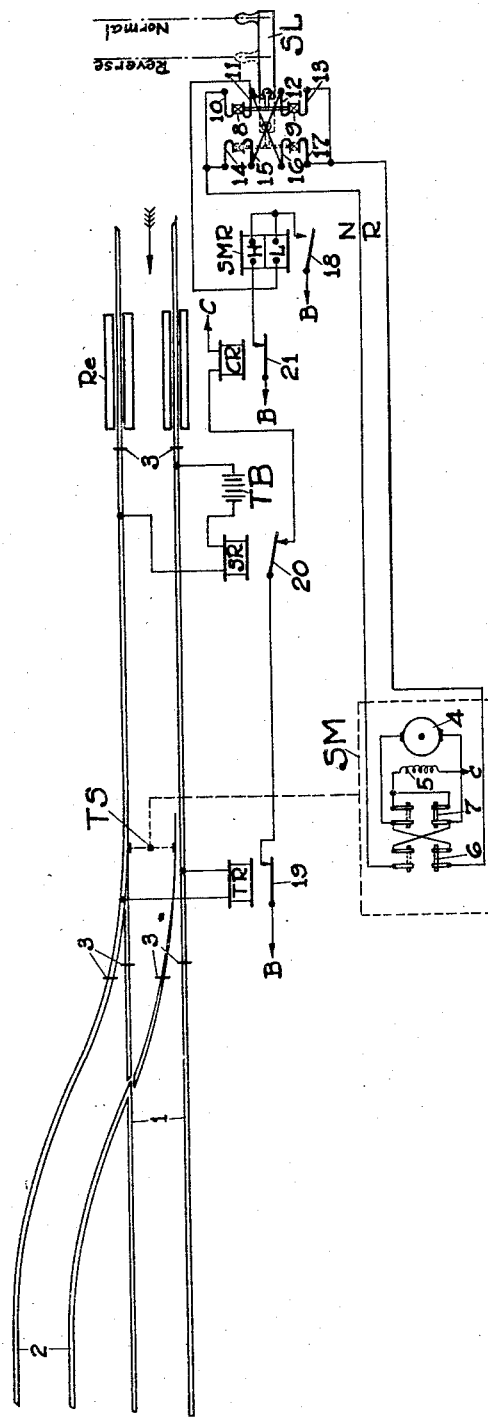
INVENTOR
R. B. Elsworth,
BY Neil D. Preston,
his ATTORNEY Patented Mar. 3, 1931

1,794,597

UNITED STATES PATENT OFFICE

ROBERT B. ELSWORTH, OF ALBANY, NEW YORK, ASSIGNOR TO GENERAL RAILWAY SIGNAL COMPANY, OF ROCHESTER, NEW YORK

RAILWAY-TRAFFIC-CONTROLLING SYSTEM

Application filed February 27, 1929. Serial No. 343,197.

This invention relates in general to detector track circuits for car retarders, and has more particular reference to a circuit, used in connection with a turn-out track switch and a track brake car retarder, and so arranged as to prevent the throwing of the track switch under a car.

In hump yards and classification yards, generally, it is always desirable to economize in space, and where a car retarder of the track brake type is employed to decrease the speed of a car before shunting it through a track switch into a turn-out track, it is necessary to provide a section of track, conveniently termed a detector track section, between the exit end of the retarder and the track switch. This detector track section must be long enough, depending on the leaving speed of the car, to require sufficient time for the car to traverse the detector track section, to insure the initiation of a switch machine for operating the track switch, and the completion of the operation of the switch machine so as to insure the throwing of the track switch before it be reached by the car.

If the switch machine be provided with control means, such as having its energizing circuit passing through the front point of a track relay, so as to insure the switch machine against initiation during occupancy of this detector track section, then this track section must be long enough to care for the time of operation of the switch machine and also for the time required by the track relay to respond to the shunting out effect produced by occupancy of its track section to release its contact fingers.

Unless the detector track section between the exit end of the car retarder and the turnout switch be long enough the track switch can be energized so tardily as to cause the track switch being thrown beneath a car.

Accordingly, it results from the above, that the faster be the action of the track relay or other means for safeguarding against tardy energization of the switch machine the shorter can safely be made the detector track section, other things being equal, and hence the greater the economy in space.

The same general problem arises in connection with an application filed under the name of Ned C. L. Brown, Ser. No. 337,826, filed February 6, 1929.

With the above and other considerations in mind it is proposed, in accordance with the present invention, to employ in connection with a switch machine for operating a track switch spaced some distance along the track from the exit end of a track car retarder, a quick acting direct current tractive type relay connected across the detector track section. Also to employ, in connection with this track relay, a second quick acting direct current tractive type relay connected in series with the source of track circuit energy between such source and the track rails. This series connected relay is arranged to be normally deenergized, but to quickly pick up immediately upon occupancy of the detector track section, due to the increased flow of current in the track rails due to the short circuiting of the source by the occupying train. The controlling circuits for energizing the switch machine in normal and reverse directions, are carried through a front point of the track relay, and a back point of the series connected relay, whereby the switch machine can be energized only when the usual track relay is picked up and the series connected relay is in released position. The series connected relay responds much more quickly than does the usual track relay, to the presence of a train on its detector track section, and picks up more quickly than the usual track relay releases. In this manner a more rapid response to the shunt effect of an occupying car is obtained, than if the release of the contact finger of a usual shunted out track relay were depended on, and as a result, the turn-out track switch can be located, with safety, a shorter distance from the exit end of the car retarder than would otherwise be the case.

Further objects, purposes and characteristic features of the invention will appear as the description progresses, reference being had to the accompanying drawing showing, in a wholly diagrammatic manner, and not in any way in a limiting sense, one form which the invention can assume.

The single figure of drawing represents, diagrammatically one form of applicant's invention.

Referring now to the drawing, a stretch of single track is shown constituted by track rails 1, with a turn-out track being controlled by a track switch TS movable, in the usual manner, for main line or turn-out traffic. The track is furnished with insulating joints 3 in either or both rails for defining a detector track section therebetween. At the entrance end to the detector track section, travel being in the direction of the arrow, is a car retarder Re, which is for example as shown in the patent to Hannauer 1,612,865, granted January 4, 1927.

A source of current TB, shown as a battery, is connected to the track rails 1, at the entrance end of the detector track section, one side of the battery TB being connected to the track rails in series with a relay SR, for a purpose to be later explained.

For operating the track switch TS, there is employed a switch machine SM, which is of any usual or suitable form such, for example, as shown in the patent to Howe 1,605,546, granted November 2, 1926. The switch machine, which is shown in a wholly diagrammatic manner, includes an armature 4, a field 5, and movable contacts 6 and 7 which are operated by the switch machine to set up normal and reverse operating circuits by moving the contacts 6 and 7 from their full line positions, to their dotted line positions.

Located at any convenient point, usually at some distance from the track switch TS and the switch machine SM, in a signal tower, is a switch machine lever SL manually operable to control the energizing circuits for the switch machine. This lever SL can be reciprocated in the usual manner, to move contacts 8 and 9 so as to bridge across fixed contacts 10—11, 12—13 or fixed contacts 14—15, 16—17 whereby to control the switch machine as described in greater detail below.

For preventing initiation of the switch machine SM during occupancy of the detector track section, there are provided relays CR and SMR, the first being considered a control relay and the second a switch machine relay. The relay SMR has two windings, a high resistance winding H and a low resistance winding L, and is provided with a contact finger 18, at times included in a stick circuit to be discussed below.

The track relay TR is provided with a contact finger 19, the series connected track relay SR is provided with a contact finger 20, and the control relay CR is provided with a contact finger 21.

The usual procedure in a classification yard, in connection with classifying cars, is to pass the car through a retarder such as Re to decrease the speed sufficiently to allow it to safely pass through a track switch such as TS and pass onto a turn-out track such as constituted by the rails 2—2.

For convenience in explanation and simplicity in the showing, the opposite terminals of a source or sources of electrical energy, are indicated by the letters B and C, in a usual manner.

In connection with the switch machine SM, there is a wire N, indicating the normal wire for causing the switch machine to throw the track switch to normal, and a wire R indicating the reverse wire for operating the switch machine to throw the track switch to reverse position.

It will be observed that when the detector track section defined by the insulating joints 3 is unoccupied, the relay TR is energized and the relay SR is de-energized, whereby to complete an energizing circuit for the control relay CR, which includes contact finger 19 and front point of relay TR and contact finger 20 and back point of relay SR. In this manner relay CR is energized when the detector track section is unoccupied.

Switch machine relay SMR is arranged to be energized and to pick up its stick contact finger 18, upon proper movement of the switch machine lever SL, providing control relay CR is energized so as to have its contact finger 21 in picked up position.

Assume now that it is desired to shunt a car through the track switch TS and onto the turn-out tracks 2, and that an operator in a signal tower or otherwise, generally located at a considerable distance from the track switch TS and the switch machine SM, moves the lever SL to the left as viewed in the drawing, to position the lever in its "reverse" position. If this operation of the lever SL takes place, while relay CR is still in picked up position, as shown in the drawing, a circuit is completed for energizing the switch machine SM to cause it to move the track switch TS to reverse or turn-out position. Relay SMR is first picked up through a circuit including contact finger 21 and front point of relay CR, high resistance winding H of relay SMR, low resistance winding L of relay SMR, contact 9 in its dotted line position, wire R, contact 6 of the switch machine SM in its full line position, armature 4, contact 7 of the switch machine in its full line position, and field winding 5.

On picking up of relay SMR an energizing circuit for the switch machine is completed which, instead of including the two windings H and L of relay SMR in series, as in the circuit above indicated, includes only the low resistance winding L, this energizing circuit for the switch machine including contact finger 18 and front point of relay SMR, winding L of relay SMR, contact 9 in its dotted line position, wire R, etc., as traced just above.

When the switch machine SM is energized through its reverse wire R, it operated in a direction to move the track switch TS to turn out position, and on completion of its stroke, the movable contacts 6 and 7 are arranged, in the usual manner, to be moved to their dotted line position, to thus break the energizing circuit for the switch machine. The contacts 6 and 7 are preferably moved by snap action mechanism after completion of the stroke of the track switch whereby to avoid any possibility of the operator reversing the switch machine in mid-stroke by reversing the lever SL, this obviously being impossible unless the movable contacts 6 and 7 are then in their upper or dotted line positions.

Operation of the track switch to normal position, from its reverse position, is effected in the manner above described, upon movement of the lever SL to the right, as viewed in the drawing, to its "normal position".

If the lever SL had been moved to the reverse position a sufficient time after occupancy of the detector track section for the relay SR to be picked up so as to deenergize relay CR and cause it to release its contact finger 21, then the above described pick up circuit for relay SMR would be broken at contact finger 21 in its released position. Accordingly, relay SMR could not be picked up, and hence the above described energizing circuit for the switch machine, would remain open at contact finger 18 of relay SMR in its released position. Thus it is seen that provision has been made whereby a tardy actuation of the lever SL fails to cause operation of the switch machine, and hence avoids all possibility of the switch machine being initiated so tardily as to have the occupying car reach the track switch TS while it is being thrown.

The relays TR and SR are preferably so adjusted that should there be insufficient track circuit energy to cause relay SR to pick up on occupancy of the detector track section, the track relay TR will have received too little energy to have maintained it in picked up condition. With such adjustment the safeguarding system for preventing tardy energization of the switch machine is on the well recognized closed circuit principle, even though the operation of the relay SR, per se, is on the open circuit principle.

The usual track relay TR, even though designed to be quick acting, is always more or less sluggish in releasing upon being shunted out by an occupying car, due to the fact that energy is not completely taken off of its winding, and to the further fact that its winding is short-circuited so as to allow the ready local flow of current due to the induced electro-motive force caused by decay of flux threading the relay core. In the case of the relay SR however, it can be readily designed to pick up practically instantaneous upon occupancy of its track circuit, so that the speedy pick up of relay SR is taken advantage of, without thereby sacrificing the security only obtainable by the system as a whole operating on the closed circuit principle.

The time required for relay SR to pick up, upon occupancy of its track section, plus the time required for the resulting release of relay CR, is much less than the time required for relay TR to release on being shunted by the occupying car. Thus it is readily seen that the described arrangement affords a much quicker response to the occupancy of the detector track section than can be obtained by the use of the usual track relay, such as relay TR.

The relay CR is interposed between the relay SR and the relay SMR, in order that the source of energy for operating the switch machine can be located in the tower adjacent the lever SL, rather than being at the track switch location. In this manner considerable line wire is saved. However it is contemplated that, if desired, the relay CR can be omitted and the control which it exerts over relay SMR be obtained directly from the relays TR and SR. If relay CR be omitted, the back point of relay SR is directly connected to the left side of winding H of relay SMR.

The above described operation is only affected by this modification, in that the response to the occupancy of the detector track circuit is quicker by the amount of time required for relay CR to release its contact finger 21 upon having its energizing circuit opened, while the disadvantage of such an arrangement is the necessity for using extra line wire.

The switch machine, on completion of its stroke, can be wired up to complete a snubbing circuit to bring it quickly to a standstill, such arrangement not being here shown, merely in the interest of simplifying the disclosure. For such a showing, reference can be had to application Ser. No. 337,826, filed February 6, 1929.

The above rather specific description of one form of the present invention, is given solely by way of illustration, and is not intended, in any manner whatsoever, in a limiting sense. Obviously, the invention can assume many different physical forms, and is susceptible of numerous modifications, and all such forms and modifications are intended to be included, in this application, as come within the scope of the appended claims.

Having described my invention, I now claim:—

1. In combination, a detector track circuit, a track relay connected across said circuit, a source of energy connected across said circuit, a series relay connected in series between said source and said circuit, and a control circuit controlled by both of said relays.

2. In a control system, in combination, a section of railway track, a track brake at one end of said track, a turn out switch at the other end of said track, a track relay connected across the rails of said section, a series relay in series circuit with a source of energy connected across said section, a control circuit, each of said relays controlling said control circuit.

3. In a control system, in combination, a section of railway track, a track brake at one end of said track, a turn out switch at the other end of said track, a track relay connected across the rails of said section, a series relay in series circuit with a source of energy connected across said section, and a control circuit passing through a front point of said track relay and a back point of said series relay so as to be controlled by each of said relays.

4. In a control system, in combination, a section of railway track, a track brake at one end of said track, a turn out switch at the other end of said track, a track relay connected across the rails of said section, a series relay in series circuit with a source of energy connected across said section, and a single control circuit controlled jointly by said relays, said track relay being energized and said series relay being de-energized when said track section is unoccupied, and vice versa when said track section is occupied.

5. In a control system, in combination, a section of railway track, a track brake at one end of said track, a turn out switch at the other end of said track, a track relay connected across the rails of said section, a series relay in series circuit with a source of energy connected across said section, said track relay being energized and said series relay being de-energized when said track section is unoccupied, and vice versa when said track section is occupied, means for operating said switch, and a control circuit passing through a front point of said track relay and a back point of said series relay for controlling functioning of said switch operating means.

6. In combination, a detector track section, a car retarder at one end of said section, a turn out switch at the other end of said section, a switch machine for operating said switch, a track relay connected across the rails of said section, a source of energy connected across the rails of said section, a series relay connected between said source and one rail, and a circuit for controlling operation of said switch machine and passing through a front and back point respectively, of said track and series relays, whereby said switch machine cannot be initiated during occupancy of said track section.

In testimony whereof I affix my signature.

ROBERT B. ELSWORTH.